Patented Apr. 24, 1928.

1,667,327

UNITED STATES PATENT OFFICE.

BERTRAM MAYER, OF BASEL, AND JOSEF GRIMMER, OF NEUEWELT, NEAR BASEL, SWITZERLAND, ASSIGNORS TO THE FIRM SOCIETY OF CHEMICAL INDUSTRY IN BASLE, OF BASEL, SWITZERLAND.

TRISAZO DYES DERIVED FROM DEHYDRO-THIO-P-TOLUIDINE-SULPHONIC ACID AND RESORCINOL AND PROCESS OF MAKING SAME.

No Drawing. Application filed February 24, 1927, Serial No. 170,736, and in Switzerland March 8, 1926.

The present invention relates to new dyestuffs, it comprises the new products, the process of making same and the material which has been dyed with the new dyestuffs.

It has been found that new substantive azo-dyestuffs are obtained by coupling in any desired succession one molecule of resorcinol with one molecule of diazotized dehydrothioparatoluidine sulphonic acid and one molecule of a diazotizedamino-azo dyestuff of the general formula $$R_1-N=N-R_2-NH_2$$

in which $R_1$ and $R_2$ are aromatic nuclei free from hydroxy groups which can be different from each other and of which at least one carries at least one sulphonic group.

The new dyestuffs thus obtained which correspond most probably to the general formula:—

$$R_1-N=N-R_2-N=N-\text{resorcinol}-N=N-\cdots$$

in which $R_1$ and $R_2$ have the above mentioned signification, form dark-brown to black-brown powders which are soluble in water on addition of soda solution with yellow brown to red brown and violet brown color. They dye cotton yellow-brown to orange-brown, to red-brown and to violet-brown tints, which are remarkable by good equalizing properties and in part also by their fastness to light. The new dyestuffs may be discharged very well. If the new dyestuffs contain a nitro- or an acetylamino-group these groups may by careful reduction or careful saponification be converted into $NH_2$-groups. The dyestuffs thus obtained may then be further diazotized and developed on the fiber.

The following examples illustrate the invention, the parts being by weight:—

*Example 1.*

The mono-azo-dyestuff from 19.5 parts of diazotized sodium sulphanilate and 24.5 parts of the sodium salt of Clève's acid is diazotized in the usual manner and the diazo compound combined in presence of soda with the mono-azo-dyestuff, which is obtained by diazotizing 32 parts of dehydrothioparatoluidine sulphonic acid, by adding to the diazo compound thus obtained an aqueous solution of 11 parts of resorcinol and by neutralizing the mineral acid with the calculated quantity of soda. The coupling to the trisazo-dyestuff is complete after a short time. The dyestuff thus obtained is salted out, filtered and dried. It is a black-brown powder which dissolves in water on addition of soda with a red-brown color. In concentrated sulphuric acid the product is soluble with dark green color. On cotton it produces brown tints.

The new dyestuff corresponds most probably to the formula:—

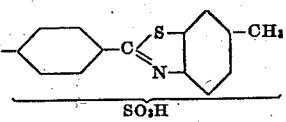

in which one of the two $x$'s stands for a radical of sulphonic acid and the other for a hydrogen atom.

The same dyestuff is also obtained by coupling the diazo-compound of the above-mentioned mono-azo-dyestuff from sulphanilic

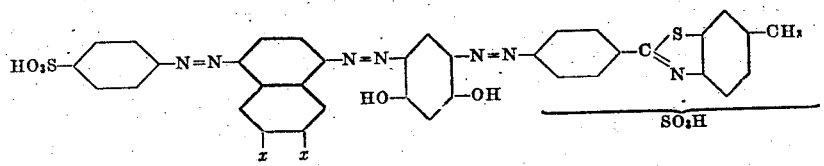

acid and Clève's acid with resorcinol in presence of soda and by combining the disazo-dyestuff thus obtained in the usual manner with diazotized dehydrothioparatoluidine sulphonic acid. Similar products are obtained by substituting sulphanilic acid by metanilic acid, or o-amino-benzol sulphonic acid, toluidine sulphonic acids, anisidine sulphonic acids, etc. As first diazotizing component an amino-disulphonic acid may be used, and as middle component α-naphthylamine. The substitution of sulphanilic acid by the p-nitraniline-o-sulphonic acid leads to a dyestuff dyeing yellow-brown, the substitution of sulphanilic acid by mono-acetyl-p-phenylenediamine leads to a dyestuff which after saponification of the acetyl group dyes cotton red-brown.

*Example 2.*

30 parts of sodium p-amino-azo-benzol-p-sulphonate are diazotized in the usual way and the diazo-compound is coupled with the mono-azo-dyestuff obtained, as described in Example 1, from 32 parts of dehydrothioparatoluidine sulphonic acid and 11 parts of resorcinol in presence of soda solution. After completed coupling, the trisazo-dyestuff thus obtained is salted out, filtered and dried. It is a dark brown powder, which, on addition of soda solution, is soluble in water with a yellow-brown color. In concentrated sulphuric acid it dissolves with a violet color. It dyes cotton orange-brown tints.

The new dyestuff corresponds most probably to the formula:—

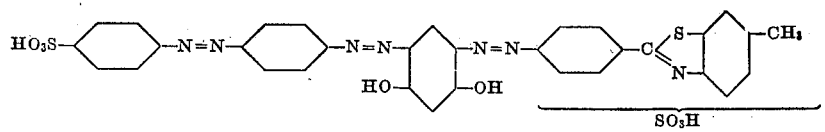

Dyestuffs of a similar constitution are produced by using the p-amino-azo-dyestuffs which are obtained in the well known way from the various aniline-, toluidine-, chloroaniline-, chlorotoluidine-, nitraniline-, aminophenolether-sulphonic acids, etc., and amines, as for example aniline, o-toluidine, p-xylidine, o-anisidine, o-phenetidine, cresidine, etc., p-amino-azo-dyestuffs which are sulphonated in both nuclei such as amino-azo-toluene-disulphonic acid may also be used.

*Example 3.*

34.7 parts of sodium 2-naphthylamine-4.8-disulphonate are diazotized in the usual manner and coupled with 13.7 parts of cresidine. After completed coupling, the mono-azo-dyestuff is further diazotized as usual with nitrite and hydrochloric acid and combined with the soda solution of the intermediate dyestuff obtained, as described in Example 1, from 32 parts of dehydrothioparatoluidine sulphonic acid and 11 parts of resorcinol. After a short time the coupling is complete. The trisazo-dyestuff is salted out, filtered and dried. It forms a black brown powder which, on addition of soda solution, dissolves in water with a red-brown color. In concentrated sulphuric acid the product is soluble with violet-grey color. It dyes cotton red-brown tints.

The new dyestuff corresponds most probably to the formula:—

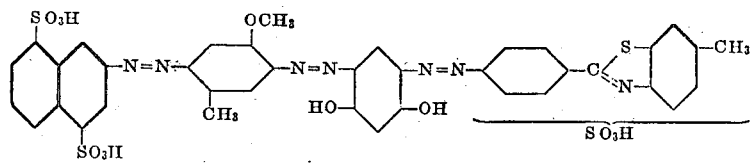

In this case the 2-naphthylamine-4.8-disulphonic acid may also, of course, be replaced by further mono-and disulphonic acids which derive from β- as well as from α-naphthylamine. The cresidine radical may also be replaced by radicals of other primary amines with free 4-position, as for example p-xylidine, m-toluidine, o-anisidine, o-toluidine, aniline, etc.

*Example 4.*

The mono-azo-dyestuff from 34.7 parts of sodium 2-naphthylamine-4.8-disulphonate and 14.3 parts of α-naphthylamine is diazotized in the usual way and the diazo-compound coupled in soda solution with the intermediate dyestuff obtained, as described in Example 1, from 32 parts of dehydrothioparatoluidine sulphonic acid and 11 parts of resorcinol. After completed coupling, the trisazo-dyestuff is salted out, filtered and dried. It forms a black brown powder, which, on addition of soda, dissolves in water with a violet-brown color.

In concentrated sulphuric acid it is soluble with an olive color. It dyes cotton violet-brown tints.

The new dyestuff corresponds most probably to the formula:—

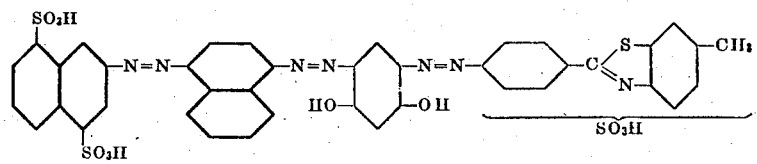

Also in this case other naphthlyamine sulphonic acids may be used instead of 2-naphthylamine-4.8-sulphonic acid, as for example 2-naphthylamine-6-sulphonic acid, or 1-naphthylamine-2-sulphonic acid or 1-naphthylamine-3-sulphonic acid or 1-naphthylamine-4-sulphonic acid or 1-naphthylamine-5-sulphonic acid or 1-naphthylamine-6-sulphonic acid or 1-naphthylamine-7-sulphonic acid or disulphonic acids, as for example 1-naphthylamine-3.6- or -4.6-disulphonic acid. α-naphthylamine may also be replaced by its substitution products coupling in 4-position. Thus for example the dyestuff of the formula:—

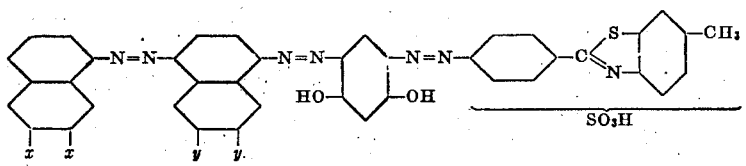

in which one of the $x$'s and one of the $y$'s signifies a sulphonic group and in which the other $x$ and the other $y$ represents a hydrogen atom, forms a black brown powder, which dissolves in concentrated sulphuric acid with a green color. On addition of soda solution it is soluble in water with a violet-brown color and also dyes cotton violet-brown tints.

What we claim is:—

1. The process for the manufacture of new substantive azo-dyestuffs of the probable general formula:—

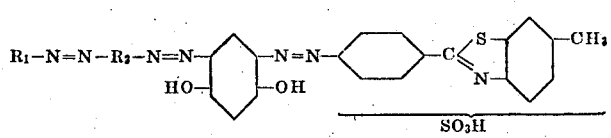
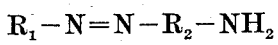

in which $R_1$ and $R_2$ are aromatic nuclei free from hydroxy groups which may be different from each other and of which at least one carries at least one sulphonic group, consisting in coupling in any desired succession one molecule of resorcinol with one molecule of diazotized dehydrothioparatoluidine sulphonic acid and with one molecule of a diazotized amino-azo-dyestuff of the general formula:

$$R_1-N=N-R_2-NH_2$$

in which $R_1$ and $R_2$ have the above mentioned signification.

2. The process for the manufacture of new substantive azo-dyestuffs of the probable general formula:—

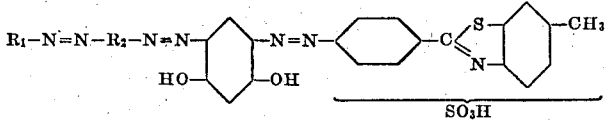
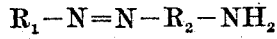

in which $R_1$ and $R_2$ are aromatic nuclei free from hydroxy groups, of which at least one carries at least one sulphonic group and of which at least one is a naphthalene nucleus, consisting in coupling in any desired succession one molecule of resorcinol with one molecule of diazotized dehydrothioparatoluidine sulphonic acid and with one molecule of a diazotized amino-azo-dyestuff of the general formula:—

$$R_1-N=N-R_2-NH_2$$

in which $R_1$ and $R_2$ have the above mentioned signification.

3. The process for the manufacture of new substantive azo-dyestuffs of the probable general formula:—

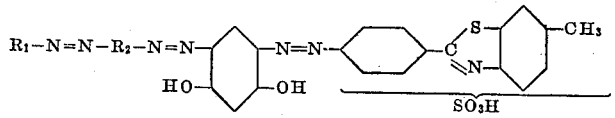

in which $R_1$ and $R_2$ are aromatic nuclei free from hydroxy groups, of which at least one carries at least one sulphonic group and of which at least $R_2$ corresponds to a naphthalene nucleus, consisting in coupling in any desired succession one molecule of resorcinol with one molecule of diazotized dehydrothioparatoluidine sulphonic acid and with one molecule of a diazotized amino-azo-dyestuff of the general formula:—

$$R_1-N=N-R_2-NH_2$$

in which $R_1$ and $R_2$ have the above mentioned signification.

4. The process for the manufacture of new substantive azo-dyestuffs of the probable general formula:—

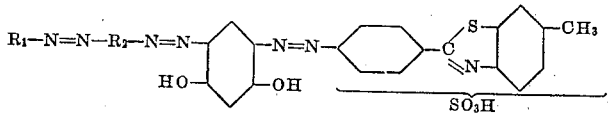

in which $R_1$ and $R_2$ are aromatic nuclei free from hydroxy groups, of which at least one carries at least one sulphonic group and of which one corresponds to a naphthalene nucleus and the other to a benzene nucleus, consisting in coupling in any desired succession one molecule of resorcinol with one molecule of diazotized dehydrothioparatoluidine sulphonic acid and with one molecule of a diazotized amino-azo-dyestuff of the general formula:—

$$R_1-N=N-R_2-NH_2$$

in which $R_1$ and $R_2$ have the above mentioned signification.

5. As new products the new substantive azo-dyestuffs of the probable general formula:—

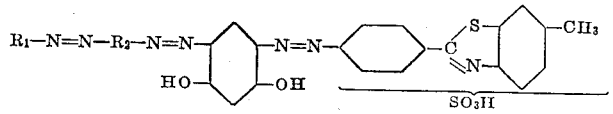

in which $R_1$ and $R_2$ are aromatic nuclei free from hydroxy groups, which may be different from each other and of which at least one carries at least one sulphonic group, the said products forming dark brown to black brown powders which, on addition of soda solution, dissolve in water with yellow brown to red brown and violet brown colors, and which dye cotton very even, yellow-brown to orange-brown, red-brown, and violet-brown tints.

6. As new products the new substantive azo-dyestuffs of the probable general formula:—

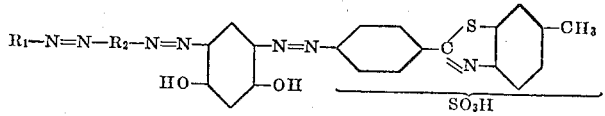

in which $R_1$ and $R_2$ are aromatic nuclei free from hydroxy groups, of which at least one carries at least one sulphonic group and of which at least one is a naphthalene nucleus, the said products forming dark brown to black brown powders which, on addition of soda solution, dissolve in water with yellow brown to red brown and violet brown colors and which dye cotton very even, yellow-brown to orange-brown, red-brown, and violet-brown tints.

7. As new products the new substantive azo-dyestuffs of the probable general formula:—

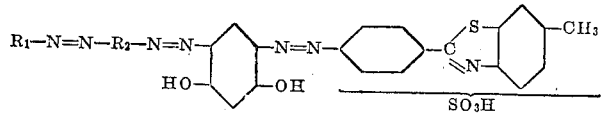

in which $R_1$ and $R_2$ are aromatic nuclei free from hydroxy groups, of which at least one carries at least one sulphonic group and of which at least $R_2$ corresponds to a naphthalene nucleus, the said products forming dark brown to black brown powders, which, on addition of soda solution, dissolve in water with yellow brown to red brown and violet brown colors and which dye cotton very even, yellow-brown to orange-brown, red-brown, and violet-brown tints.

8. As new products the new substantive azo-dyestuffs of the probable general formula:—

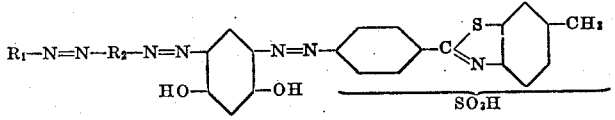

in which $R_1$ and $R_2$ are aromatic nuclei free from hydroxy groups, of which at least one carries at least one sulphonic group and of which one corresponds to a naphthalene nucleus and the other to a benzene nucleus, the said products forming dark brown to black brown powders, which, on addition of soda solution, dissolve in water with yellow brown to red brown and violet brown colors and which dye cotton very even, yellow-brown to orange-brown, red-brown, and violet-brown tints.

9. The material dyed with the dyestuffs of claim 5.

10. The material dyed with the dyestuffs of claim 6.

11. The material dyed with the dyestuffs of claim 7.

12. The material dyed with the dyestuffs of claim 8.

In witness whereof we have hereunto signed our names this 12th day of February 1927.

BERTRAM MAYER.
JOSEF GRIMMER.